US007363939B2

(12) United States Patent
Fritzer et al.

(10) Patent No.: US 7,363,939 B2
(45) Date of Patent: Apr. 29, 2008

(54) BLEED VALVE

(75) Inventors: Anton Fritzer, Markdorf (DE); Tobias Pfleger, Friedrichshafen (DE); Hans-Ulrich Nonnast, Weißensberg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 551 days.

(21) Appl. No.: 11/043,454

(22) Filed: Jan. 26, 2005

(65) Prior Publication Data
US 2005/0178447 A1 Aug. 18, 2005

(30) Foreign Application Priority Data
Feb. 18, 2004 (DE) ............. 10 2004 007 750

(51) Int. Cl.
*G05D 23/08* (2006.01)
*G05D 23/12* (2006.01)
*F16K 15/14* (2006.01)

(52) U.S. Cl. .................... 137/512.15; 137/512.4; 236/92 C; 236/93 R

(58) Field of Classification Search ............. 137/512.1, 137/512.15, 512.3, 512.4, 854; 236/92 C, 236/93 R, 101 A
See application file for complete search history.

(56) References Cited

U.S. PATENT DOCUMENTS

| 273,757 | A | * | 3/1883 | Morel | 236/93 R |
| 1,608,205 | A | * | 11/1926 | Beals et al. | 236/93 R |
| 2,647,017 | A | * | 7/1953 | Coulliette | 236/93 R |
| 2,673,687 | A | * | 3/1954 | Alban et al. | 236/93 R |
| 3,895,646 | A | * | 7/1975 | Howat | 236/93 R |
| 6,668,978 | B2 | | 12/2003 | Fessler et al. | |
| 2005/0098215 | A1 | * | 5/2005 | Call et al. | 137/512.15 |

FOREIGN PATENT DOCUMENTS

| DE | 198 12 274 A1 | 9/1999 |
| DE | 199 02 408 A1 | 8/2000 |
| DE | 199 33 470 A1 | 1/2001 |
| DE | 100 44 177 C1 | 1/2002 |

* cited by examiner

*Primary Examiner*—John Rivell
(74) *Attorney, Agent, or Firm*—Davis Bujold & Daniels, P.L.L.C.

(57) ABSTRACT

A bleed valve (1) for a pipe into which a non-return function is integrated. The bleed valve is preferably designed to be a thermal valve.

8 Claims, 1 Drawing Sheet

BLEED VALVE

This application claims priority from German Application Serial No. 10 2004 007 750.9 filed Feb. 18, 2004.

FIELD OF THE INVENTION

The present invention relates to a bleed valve.

BACKGROUND OF THE INVENTION

In infinitely variable change-speed gears, according to the state of the art, the selector valve is generally arranged separately from the hydraulic control unit, which is arranged in the oil pan in a separate selector valve housing in the upper region of the transmission. The connection between the hydraulic control unit and the selector valve housing, as well as between the selector valve housing and the forward clutch and the backward brake, is established by pipes. When the transmission is shut off, oil can disadvantageously leak from the connecting pipe between the selector valve and the forward clutch, because in the parking position P, the upper end of the line is open via a bleed valve and on the lower end, oil can escape into the primary shaft via a rectangular ring and a bleed bore arranged behind it. The amount of air, which reaches the line due to this process and is pushed into the clutch when engaging a gear for the first time after starting, fluctuates drastically and, therefore, has a negative effect on the shifting comfort and the shift adaptation.

It is the object of the present invention to create a device, which prevents oil from escaping from an end comprising a bleed valve of a connecting pipe containing fluid, especially hydraulic fluid, particularly of the connecting pipe between the selector valve and the clutch to the front in an infinitely variable change-speed gear.

SUMMARY OF THE INVENTION

Integrate of a non-return function into the bleed valuve is suggested; the bleed valve, proviced at the end of the connecting pipe, is generally designed to be a thermal valve. In doing so, the end of the line is closed with a non-return valve in order to prevent oil or hydraulic fluid from escaping wherein, for space reasons, the non-return valve has very small dimensions and opens already at low pressure levels (<0.5 bar ) in the case of a connecting pipe vetween the selector valve and a clutch, so that the residual pressure remaining in the clutch does not lead to engagement of the clutch. With the bleed valves arranged at the end of the connecting pipe, it preferably concerns a thermal valve, which adjusts the bleed cross-section dependent on the temperature.

BRIEF DESCRIPTION OF THE DRAWINGS

The invention will now be described, by way of example, with reference to the accompanying drawings in which.

DETAILED DESCRIPTION OF THE INVENTION

Figure 1:
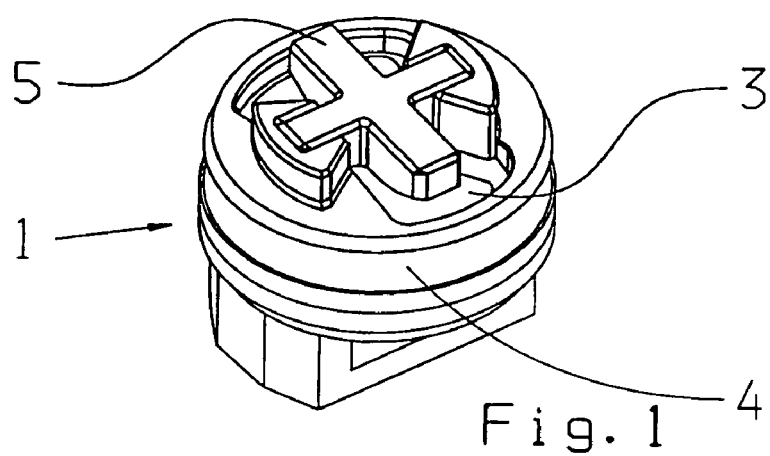
FIG. 1 is a perspective view of a preferred embodiment of the present invention.
Figure 2:
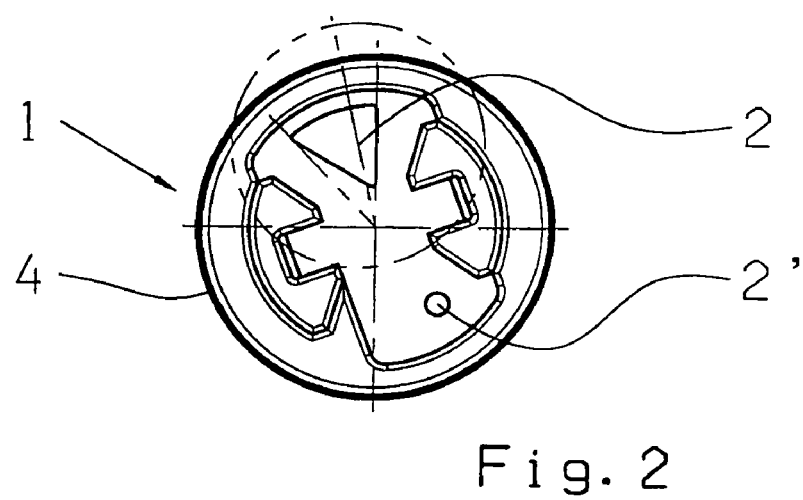
FIG. 2 is a top view onto the embodiment pursuant to FIG. 1, in which the valve openings are shown.

In the embodiment illustrated in the Figures, the bleed valve, designed as a thermal valve 1, comprising at least two valve openings 2, 2', as well as a thin spring metal sheet 3, which serves as a non-return plate and is arranged on a surface in a cover 4 of the thermal valve 1 above and around the valve openings 2, 2'. Within the framework of the illustrated exemplary embodiment, one valve opening 2 is designed as a variable valve and one valve opening 2' is designed as a fixed valve; it is also possible to provide several valve openings. Alternatively, only one variable valve opening can be provided.

Figure 3:
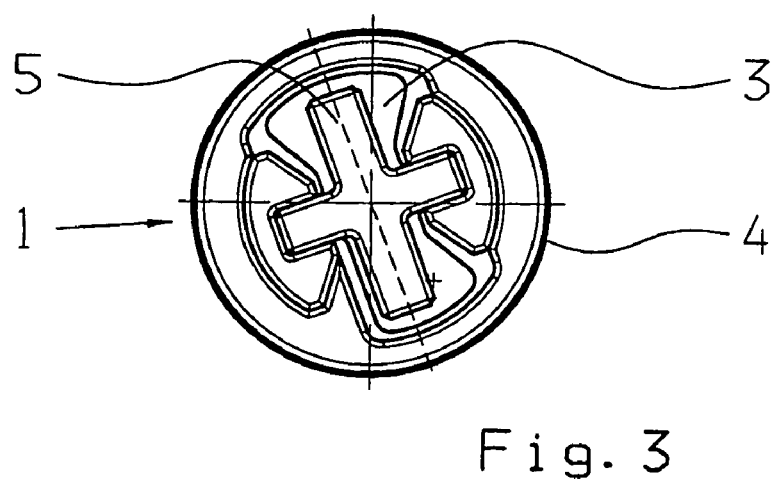
FIG. 3 is a top view onto the embodiment pursuant to FIG. 1 in the assembled state.

Furthermore the spring metal sheet 3 is fixed on the cover 4 of the thermal valve with another component 5, which is referred to in the following as a stop. According to the invention, the stop 5 prevents the plastic deformation of the spring metal sheet 3 during the bleeding process. The cover 4 and the stop 5 are preferably made of plastic. According to FIGS. 1 and 3, the stop has a cross-shaped design, however, other designs are feasible as well.

REFERENCE NUMERALS 1 thermal valve
2 valve opening
2' valve opening
3 spring metal sheet
4 plastic cover of the thermal valve
5 stop

The invention claimed is:

1. A bleed valve for a pipe comprising:
 a thermal valve having at least one variable valve opening (2) and one fixed valve opening (2'), and
 the thermal valve having an integrated non-return function and a bleed cross-section which is adjusted as a function of temperature.

2. The bleed valve according to claim 1, wherein the bleed valve comprises a thin spring metal sheet (3) which serves as a non-return plate, which is arranged on a surface of a cover (4) of the bleed valve (1) above and around valve openings (2, 2').

3. The bleed valve according to claim 2, wherein the spring metal sheet (3) is fixed to the cover (4) by an additional part (5), and the additional part (5) prevents plastic deformation of the spring metal sheet (3) during a bleeding process.

4. The bleed valve according to 3, wherein the additional part (5) has a cross-shaped design.

5. The bleed valve according to claim 3, wherein the additional part (5) and the cover (4) are both made of plastic.

6. A bleed valve for a pipe located between a selector valve and a clutch comprising:
 a bleed valve having at least one variable valve opening (2) and one fixed valve opening (2'), and
 an integrated non-return function for minimizing flow of air through the pipe and to the clutch.

7. The bleed valve according to claim 6, wherein the bleed valve comprises a thin spring metal sheet (3) located on a surface of a cover (4) of the bleed valve (1) and functioning as a non-return plate for the variable valve opening (2).

8. The bleed valve according to claim 6, wherein the bleed valve comprises a thin spring metal sheet (3) located on a surface of a cover (4) of the bleed valve (1) and functioning as a non-return plate for the at least one variable valve opening (2) and the one fixed valve opening (2'); and
 the spring metal sheet (3) is fixed to the cover (4) by an additional part (5), and the additional part (5) prevents plastic deformation of the spring metal sheet (3) during a bleeding process.

* * * * *